US007415317B2

(12) United States Patent
Toyoshima et al.

(10) Patent No.: US 7,415,317 B2
(45) Date of Patent: Aug. 19, 2008

(54) METHOD AND SYSTEM FOR CORRELATING AND COMBINING PRODUCTION AND NON-PRODUCTION DATA FOR ANALYSIS

(75) Inventors: Naoki Toyoshima, Hyogo (JP); Shinichi Murakami, Akashi Hyogo (JP); Yuko Maeda, deceased, late of Takarazuka (JP); by Kazuyuki Okazaki, legal representative, Takarazuka (JP)

(73) Assignee: Micron Technology, Inc., Boise, ID (US)

( * ) Notice: Subject to any disclaimer, the term of this patent is extended or adjusted under 35 U.S.C. 154(b) by 293 days.

(21) Appl. No.: 10/786,678

(22) Filed: Feb. 25, 2004

(65) Prior Publication Data

US 2005/0187737 A1 Aug. 25, 2005

(51) Int. Cl.
*G06F 19/00* (2006.01)
(52) U.S. Cl. .......................... 700/108; 700/121; 702/81
(58) Field of Classification Search ................. 700/108, 700/121, 109–111, 116; 702/81, 108
See application file for complete search history.

(56) References Cited

U.S. PATENT DOCUMENTS

| | | | |
|---|---|---|---|
| 4,719,694 A | 1/1988 | Herberich et al. | |
| 4,825,093 A | 4/1989 | Kiriseko et al. | 250/566 |
| 5,240,866 A | 8/1993 | Friedman et al. | 437/8 |
| 5,294,812 A | 3/1994 | Hashimoto et al. | 257/65 |
| 5,313,156 A | 5/1994 | Klug et al. | |
| 5,347,463 A | 9/1994 | Nakamura et al. | |
| 5,555,504 A | 9/1996 | Lepper et al. | 364/465.22 |
| 5,567,927 A | 10/1996 | Kahn et al. | 235/462 |
| 5,642,307 A | 6/1997 | Jernigan | 365/103 |
| 5,726,920 A * | 3/1998 | Chen et al. | 702/108 |
| 5,768,144 A * | 6/1998 | Nagase | 716/4 |
| 5,805,472 A | 9/1998 | Fukasawa | 364/579 |
| 5,886,896 A * | 3/1999 | Lantz et al. | 700/116 |
| 5,894,266 A | 4/1999 | Wood, Jr. et al. | |
| 5,915,231 A | 6/1999 | Beffa | 702/118 |
| 5,927,512 A | 7/1999 | Beffa | 209/573 |
| 5,963,881 A | 10/1999 | Kahn et al. | 702/35 |
| 6,256,593 B1 | 7/2001 | Damon et al. | 702/84 |
| 6,320,201 B1 | 11/2001 | Corbett et al. | 257/48 |
| 6,351,684 B1 | 2/2002 | Shirley et al. | |
| 6,373,976 B1 | 4/2002 | Pierrat et al. | 382/151 |
| 6,427,092 B1 | 7/2002 | Jones et al. | 700/121 |
| 6,433,871 B1 | 8/2002 | Lensing et al. | 356/381 |
| 6,446,017 B1 | 9/2002 | Skidmore | 702/81 |
| 6,465,141 B2 | 10/2002 | Boettiger et al. | |

(Continued)

*Primary Examiner*—Albert DeCady
*Assistant Examiner*—Steven R Garland
(74) *Attorney, Agent, or Firm*—Schwegman, Lundberg & Woessner, P.A.

(57) ABSTRACT

This document discusses, among other things, a method and system for correlating and combining production and non-production data for analysis for the purposes of increasing manufacturing efficiency and reducing manufacturing downtime due to abnormal conditions. In one example, this method provides for quicker data analysis which may result in less manufacturing product being discarded due to lengthy delays between abnormal conditions and the response to those conditions. In one example, a computer system is used to implement the method with the data captured from production and non-production sources being stored remotely on a server. In one example, a computer system is used to implement the method with the analyzed data being stored remotely on a server and accessed over a network for local examination.

89 Claims, 7 Drawing Sheets

U.S. PATENT DOCUMENTS

| | | | |
|---|---|---|---|
| 6,526,547 B2 | 2/2003 | Breiner et al. | 716/4 |
| 6,534,785 B1 | 3/2003 | Farnworth et al. | 257/48 |
| 6,546,304 B2 | 4/2003 | Thorvaldsson et al. | |
| 6,560,506 B2 * | 5/2003 | Toprac | 700/121 |
| 6,577,914 B1 * | 6/2003 | Bode | 700/121 |
| 6,580,961 B2 * | 6/2003 | Diggin et al. | 700/121 |
| 6,588,854 B2 | 7/2003 | Wilson et al. | |
| 6,594,013 B2 | 7/2003 | Thakur et al. | |
| 6,605,159 B2 | 8/2003 | Joslyn | 134/18 |
| 6,622,102 B2 | 9/2003 | Skidmore | 702/84 |
| 6,628,410 B2 | 9/2003 | Doan | 356/630 |
| 6,650,955 B1 | 11/2003 | Sonderman et al. | 700/108 |
| 6,661,515 B2 | 12/2003 | Worster et al. | 356/394 |
| 6,671,569 B1 | 12/2003 | Schoop et al. | |
| 6,751,518 B1 * | 6/2004 | Sonderman et al. | 700/121 |
| 6,775,630 B2 * | 8/2004 | Behkami et al. | 702/81 |
| 6,859,756 B2 | 2/2005 | Allen | |
| 7,006,948 B2 | 2/2006 | Allen | |
| 2002/0188417 A1 | 12/2002 | Levy et al. | |
| 2003/0102367 A1 | 6/2003 | Monette et al. | |
| 2004/0029299 A1 * | 2/2004 | Pasadyn et al. | 700/121 |
| 2004/0138773 A1 | 7/2004 | Tomoyasu | |
| 2005/0165731 A1 * | 7/2005 | Funk | 707/1 |
| 2005/0192694 A1 | 9/2005 | Toyoshima et al. | |
| 2006/0250906 A1 | 11/2006 | Toyoshima et al. | |
| 2006/0259177 A1 | 11/2006 | Toyoshima et al. | |

* cited by examiner

METHOD AND SYSTEM FOR CORRELATING AND COMBINING PRODUCTION AND NON-PRODUCTION DATA FOR ANALYSIS

CROSS REFERENCE TO RELATED APPLICATIONS

This patent application is related to U.S. patent application Ser. No. 10/789,895 entitled METHOD AND SYSTEM FOR AGGREGATING AND COMBINING MANUFACTURING DATA FOR ANALYSIS, to Naoki Toyoshima and Yuko Maeda, assigned to Micron Technology, Inc.

TECHNICAL FIELD

The present invention generally relates to integrated circuit manufacturing. The present invention also generally relates to methods for reducing integrated circuit manufacturing abnormalities. The present invention also generally relates to a method to correlate production data and non-production data from an integrated circuit manufacturing process for data analysis.

BACKGROUND

The current rapid progress of design rules and processing technology in semiconductor manufacturing makes yield and characteristics analysis more and more difficult and complicated. Typically production data is stored in one database, and non-production data is stored in another database. Data analysis is performed on the production data, using a variety of points for comparison. This data analysis may show abnormalities in production trends. Non-production data is separately gathered and subjected to separate analysis of conditions and identification of significant trends.

This data analysis is important to the quality of the manufactured material. Variations in production conditions can cause entire lots of product to be discarded, wasting valuable production time and money. Quick data analysis may avoid wholesale scrapping of product. Unfortunately the large magnitude of data that is collected hinders a quick analysis that would be meaningful to production goals.

Further compounding the analysis problem is that factors typically thought to be non-production are not considered in the analysis. Environmental measurements which can greatly affect the quality of manufacturing end-product are just one example of these factors. Even when one is able to qualitatively measure these factors, connecting that meaningfully to other measurements considered to be non-production for the purposes of data analysis requires a user to manually examine the data for commonalities and correlate the data based on those. Further combining that combination with actual production data greatly compounds the amount of data as well as compounding the inability to perform meaningful and timely data analysis.

What is needed is a technique to quickly combine data from production and non-production sources into a combined set of data for quicker analysis.

SUMMARY OF THE INVENTION

An embodiment of the present invention is a method for performing data analysis on data gathered in an electronic device manufacturing process. The method includes collecting production data, collecting non-production data, keying the production data, keying the non-production data, combining the production data and the non-production data into a single data set, and analyzing single data-set. An embodiment of the present invention further includes performing calculations on the production data and the non-production data. Collection of production data includes at least one of collecting parametric production data, collecting film thickness data, critical dimension data, and any other data that is relevant to the production process and its condition. Collection of non-production data includes at least one of collecting non-production data from a single data source at a single source location or from a plurality of locations, and collecting non-production data from a single data source with some temporal periodicity. In an embodiment, the temporal periodicity is fixed. In an embodiment, the temporal periodicity is not fixed.

In an embodiment the combined single data-set is analyzed to determine trends in manufacturing parameters and enable a user to make decisions as to the continuation or non-continuation of the manufacturing process. In an embodiment, a system non-manually analyzes the data and makes a determination as to the continuation or non-continuation of the manufacturing process.

In an embodiment of the present invention, the method is performed by a computer system. In an embodiment, the computer system collects the non-production data and the production data, performs calculations on the data, keys the production data with some value, keys the non-production data with some value, combines the production data and the non-production data, analyzes the single data-set and examines the analysis for current conditions in the manufacturing process. In an embodiment, the computer system responds to the current conditions of the manufacturing process by displaying an alert message when conditions are out of specification, or non-manually halting the production process when conditions are out of specifications.

Generally, non-production data, also called facility data, is stored with the date and time, e.g. time-stamp, as well as the location of the sampling. Production data, also known as production lot data, is stored with the date and time when the lot is processed at each step. By defining the proper relationships between location and time across the facility data and the production lot data, a system can automatically connect that data.

Generally facility data is sampled periodically with a specific frequency. One can correlate the lots that have been processed during that time period by examining the time-stamp of the lot as it underwent the current process step. The facility data can then be correlated to specific lots by weighted mean calculations.

A specific type of facility data is equipment control data, or equipment data.

Such equipment data is gathered when the equipment is periodically qualified and/or during daily or other periodic checks. This is generally stored with the date and time and the equipment ID, as well as possibly, some other facility data. This equipment data can be combined with the production data by correlating the lots that have been processed during the time period between equipment qualification or other periodic checks by examining the time-stamp of the lot as it underwent an operation by the current equipment. In the case of an equipment check that resets the equipment condition, the data on the equipment can not be used, and a weighted mean calculation must be used.

A specific type of production data is pilot wafer data for a vertical furnace operation. Pilot wafers are used with actual production wafers in order to monitor the film thickness, resistivity, etc. at the process using the vertical furnace. Typically, the pilot wafer is placed at the top and bottom end of boat and a space between production lots. In order to gather this data as production data an average value of the pilot wafers is used. The pilot wafer may also be used between more then one lot of production wafers. The average of the prior pilot wafer and the pilot wafer subsequent to the current lot must be averaged to be used as production data. The pilot wafer may also be during the processing of a particular lot. In such a case, one may use the pilot wafer directly as production data for that particular lot.

COMMONLY ASSIGNED PATENTS ON MANUFACTURING PROCESS DATA MEASUREMENT

The following patents are commonly assigned to the assignee of the current application and are exemplary of the types of measuring devices and data that could be used in an integrated circuit manufacturing facility and could be combined by an embodiment of the present invention to provide for quicker data analysis and manufacturing decisions. The documents listed herein are incorporated by reference for any purpose.

U.S. Pat. No. 6,256,593, "System for Evaluating and Reporting Semiconductor Test Processes;"

U.S. Pat. No. 6,427,092. "Method for Continuous Non Lot-Based Integrated Circuit Manufacturing;"

U.S. Pat. No. 6,446,017, "Method and System for Tracking Manufacturing Data for Integrated Circuit Parts;"

U.S. Pat. No. 6,534,785, "Reduced Terminal Testing System;"

U.S. Pat. No. 6,594,013, "Reflectance Method for Evaluating the Surface Characteristics of Opaque Materials;"

U.S. Pat. No. 6,605,159, "Device and Method for Collecting and Measuring Chemical Samples on Pad Surface Chip;"

U.S. Pat. No. 6,622,102, "Method and System for Tracking Manufacturing Data for Integrated Circuit Parts;" and U.S. Pat. No. 6,628,410, "Endpoint Detector and Method for Measuring a Change in Wafer Thickness in Chemical-Mechanical Polishing of Semiconductor Wafers and Other Microelectronic Substrates;"

BRIEF DESCRIPTION OF THE FIGS.

DETAILED DESCRIPTION OF THE INVENTION

In the following detailed description of exemplary embodiments of the invention, reference is made to the accompanying drawings (where like numbers represent like elements), which form a part hereof, and in which is shown by way of illustration specific exemplary embodiments in which the invention may be practices. Those embodiments are described in sufficient detail to enable those skilled in the art to practice the invention, and it is to be understood that other embodiments may be utilized and logical, mechanical, electrical and other changes may be made without departing from the scope of the present invention.

In the description, numerous specific details are set forth to provide a thorough understanding of the invention. However, it is understood that the invention may be practiced without those specific details. In other instances, well-known circuits, structures and techniques have not been shown in detail in order not to obscure the invention.

Parts of the description may be presented in terms of operations performed through the execution of programming instructions. As well understood by those skilled in the art, those operations may take the form of electrical, magnetic, or optical signals capable of being stored, transferred, combined, and otherwise manipulated through, for example, electrical components.

The term "horizontal" as used in this application is defined as a plane parallel to the conventional plane or surface of a wafer or substrate, regardless of the orientation of the wafer or substrate. The term "vertical" refers to a direction perpendicular to the horizontal as defined above. Prepositions, such as "on", "side" (as in "sidewall"), "higher", "above", "lower", "over", "below", and "under" are defined with respect to the conventional plane or surface being on the top surface of the wafer or substrate, regardless of the orientation of the wafer or substrate. The following detailed description is, therefore, not to be taken in a limiting sense, and the scope of the present invention is defined only by the appended claims, along with the full scope of equivalents to which such claims are entitled.

Figure 1:
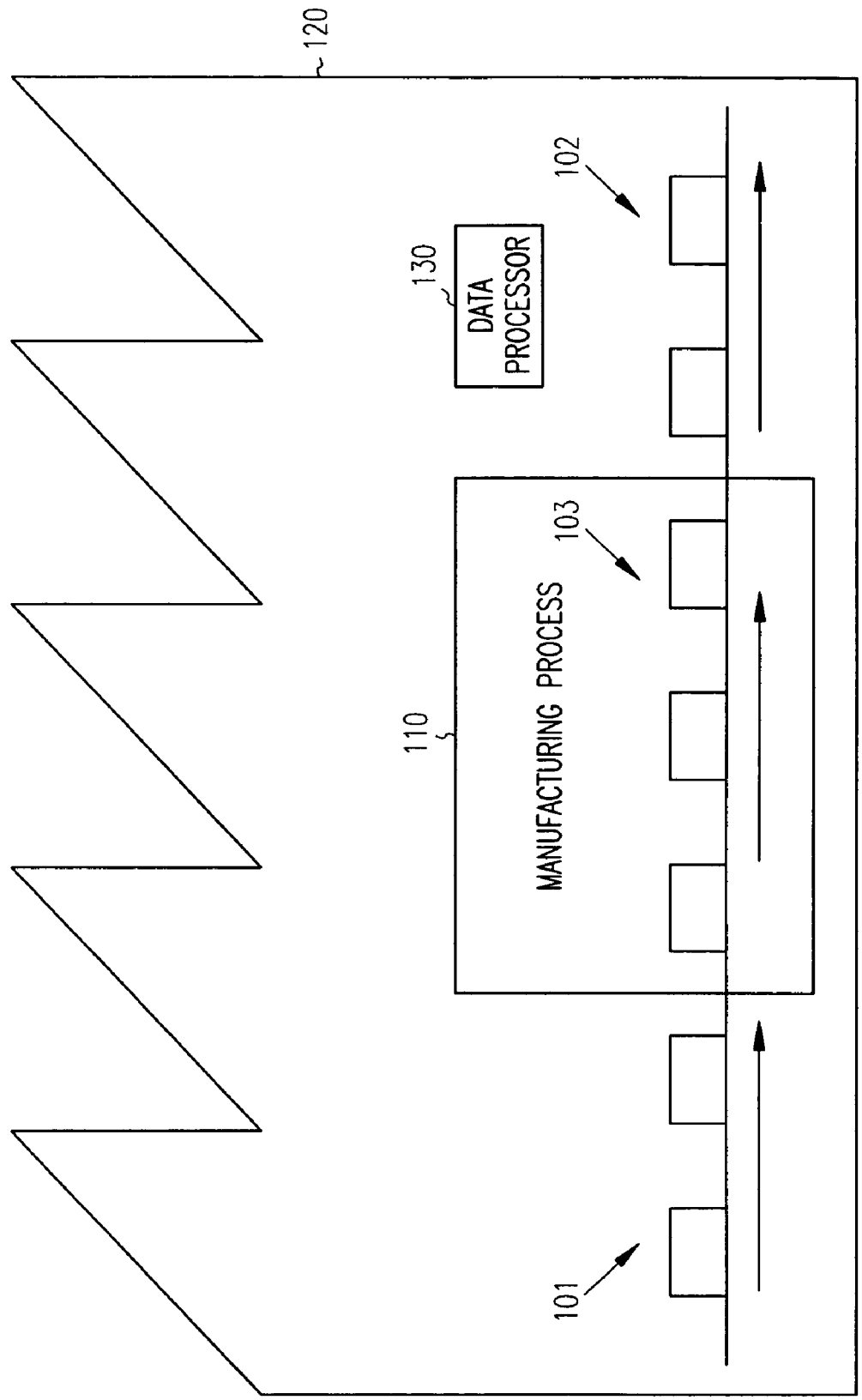
FIG. 1 is a pictorial representation of an exemplary manufacturing facility with a manufacturing process contained therein.

FIG. 1 depicts a pictorial representation of a simplified manufacturing process for items. Items, in an embodiment, include integrated circuits. The item undergoing processing 101 enters the process 110 and exits as a finished product 102. The process 110 is located in a larger manufacturing facility 120. Conditions in the machine performing the process are very important to the quality of the end product 102. The conditions of the item undergoing processing 103 are also very important to the quality of the end product. In addition, the conditions of the manufacturing facility 120 may also impact the quality of the end product. Measurements may be taken on the item 101, 102, and 103, as well as conditions of the actual manufacturing process 110. These measurements can be called production data. The production data is from sources that are directly related to the manufacturing process being performed. These sources include, but are not limited to, test probe data, parametric data, film thickness data, and critical dimension data. In an embodiment, a particular production data sample is gathered once per lot, i.e. production lot data. A production lot can be defined as a subset of the entirety of manufactured items, for example a plurality of work pieces such as electronic devices, integrated circuits, substrates, semiconductor wafers, or other similar structures in this art. A lot may further be considered as that quantity of product produced under similar conditions, at a similar establishment, over some period of time. In an embodiment, a particular production data sample is gathered multiple times per lot. In an embodiment, a particular data sample is applied across multiple production lots. Though this detailed description uses the term production data to refer to these data measurements, this is not to be taken in a limiting sense, as any data that relates directly to the manufacturing process being performed is considered to be production data. Further, production data may be further defined as being either online or offline. Online data may be data which is measured directly on the item being manufactured and may be things such as the temperature of the manufactured item, or its thickness. Online data may also be data measured from the manufacturing process in question while the item is being processed. Offline data is that data that, though directly related to the manufacturing process, is not measured on the actual manufactured item or during the actual manufacturing step, such as the operating temperature of the machine, the operating pressure, or some other measurement.

The pictorial element labeled 120 represents the entire facility in which the manufacturing process resides. Measurements may be conducted on the entire facility, as well. These measurements can be called non-production data or alternatively, facility data. The non-production data is from sources not directly related to the manufacturing process. These sources include, but are not limited to, atmospheric conditions, water conditions, gas conditions, chemical conditions, exhaust pressure, and electrical conditions. In an embodiment, a particular sample is gathered from one location by one sensor. In an embodiment, a particular sample is gathered from multiple locations by multiple sensors. Alternatively, these measurements may be called facility data as they generally, but without limitation, relate to the facility in which the production takes place. Though this detailed description uses the term non-production data, or facility data, to refer to these data measurements, this is not to be taken in a limiting sense, as any data that does not relate directly to the manufacturing process can be considered to be non-production data, or facility data. This data is inputted into a data processor 130 for further analysis.

Figure 2:
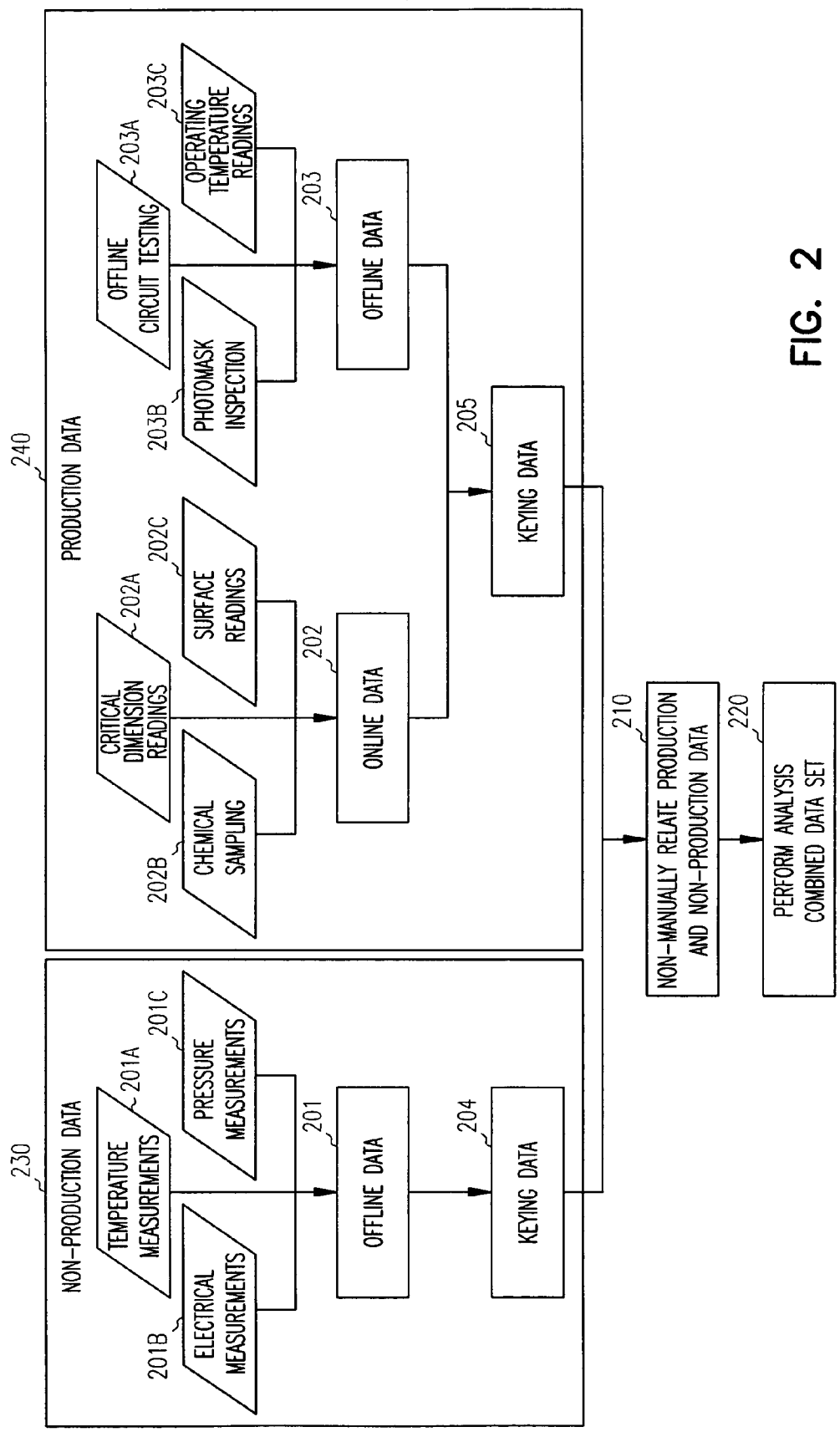
FIG. 2 is a flowchart illustrating generally, among other things, a method for collecting and correlating production and non-production data for analysis according to an embodiment of the present invention.
Figure 3:
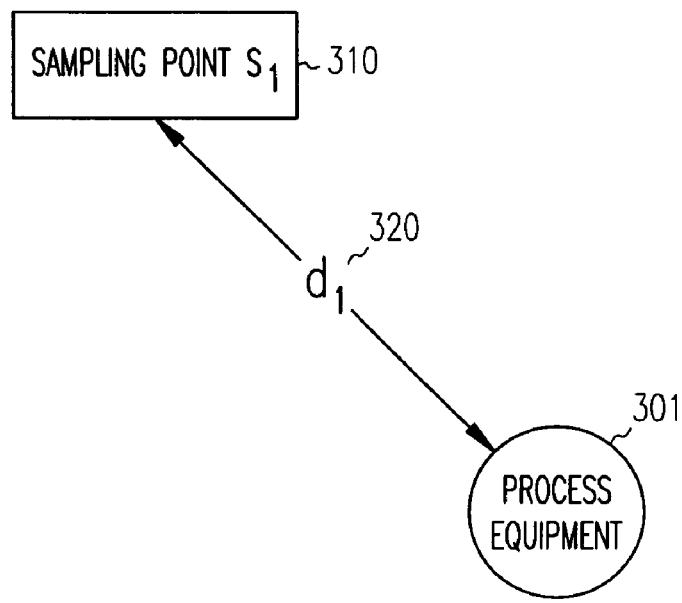
FIG. 3 is a pictorial representation of a scenario of an embodiment of the present invention.
Figure 4:
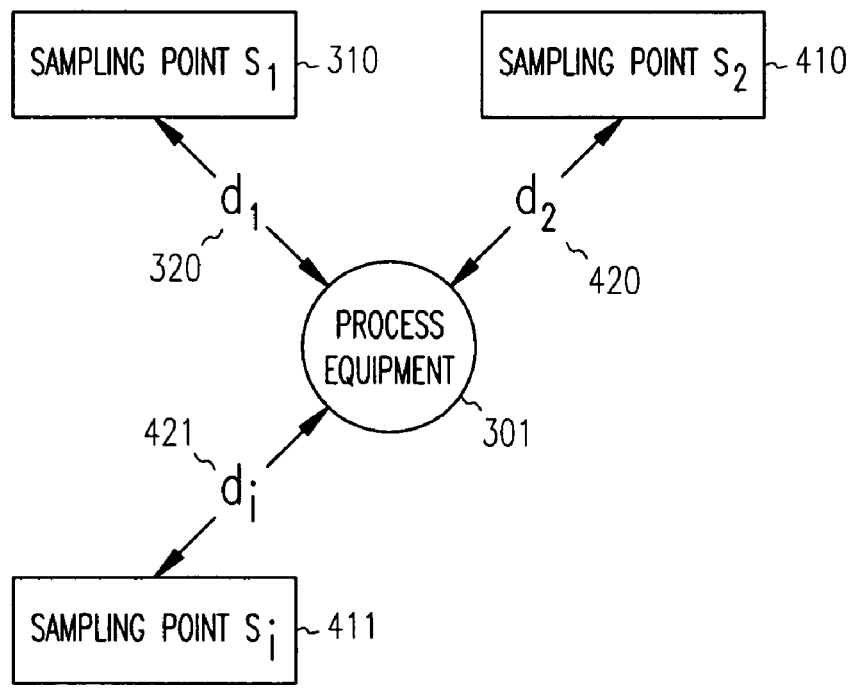
FIG. 4 is a pictorial representation of a scenario of an embodiment of the present invention.

FIG. 2 presents a method, according to an embodiment of the present invention, for combining the data taken during the manufacturing process for the purposes of data analysis. Data is collected from both production and non-production sources, at 201, 202, 203. Non-production sources may include, but are not limited to, thermometers providing temperature readings 201a, barometers providing pressure measurements 201c, staff productivity recording systems, electrical measurements 201b, equipment control data, metrology tool calibration data, etc. Non-production sources also include sources that provide any other data relevant to the production environment, where the production environment may include, but not be limited to, the facility where the production is performed, a larger physical gathering of multiple production facilities in a single geographical location, etc. Production sources may further be divided into online production sources and offline production sources. Online production sources may include, but not be limited to, critical dimension readings 202a, chemical sampling 202b, surface readings, 202c, etc. Offline production sources may include, but not be limited to, offline circuit testing 203a, photomask inspection 203b, operating temperature readings 203c, etc. At 204 and 205 the non-production data and the production data are keyed to some value, respectively. In an embodiment, the data is keyed to a temporal, or date-time, value. In an embodiment, at 204, that data is keyed with a date-time value. In an embodiment, at 205, that data is keyed with production lot data, which may be further keyed with date-time values associated with the time that a particular production lot began a manufacturing process as well as the time that the particular production lot completed the manufacturing process. In an embodiment, non-production data is measured at a single location, such as depicted in FIG. 3. In an embodiment, the sampling location for the data measurement 310 is separated some distance 320 from the process equipment 301. In an embodiment, production data is measured at a plurality of locations, such as depicted in FIG. 4. The process equipment 301 is separated by a variable distance from the locations where data is being measured. For sampling location 1 at 310, the distance 320 can be defined as $d_1$. For sampling location 2 at 410, the distance 420 can be defined as $d_2$. There may be many locations where the data is being measured. For all sampling locations I at 411, the distance 421 can be defined as $d_i$. Such multiple sampling locations 310, 410, 411 allow statistical operations on a similar type of sampled data from a plurality of different sample locations. For example, the different sample locations allow a similar type of data to be collected at a plurality of locations in a lot.

FIG. 2 further represents an embodiment of the present invention where the data being measured, both production (including online and offline) and non-production, are being measured at single locations and then being keyed at 204 and 205. For some types of data being sampled, this may be sufficient as in the case of a single measuring device measuring a single data point that can be used without manipulation. This might include, but not be limited to, a thermometer measuring the air temperature of the entire manufacturing facility, a barometer measuring the air pressure of the entire manufacturing facility, a thickness measuring device measuring the thickness of an exemplary wafer sample, staff productivity measurements such as the number of personnel on shift, etc.

Figure 5:
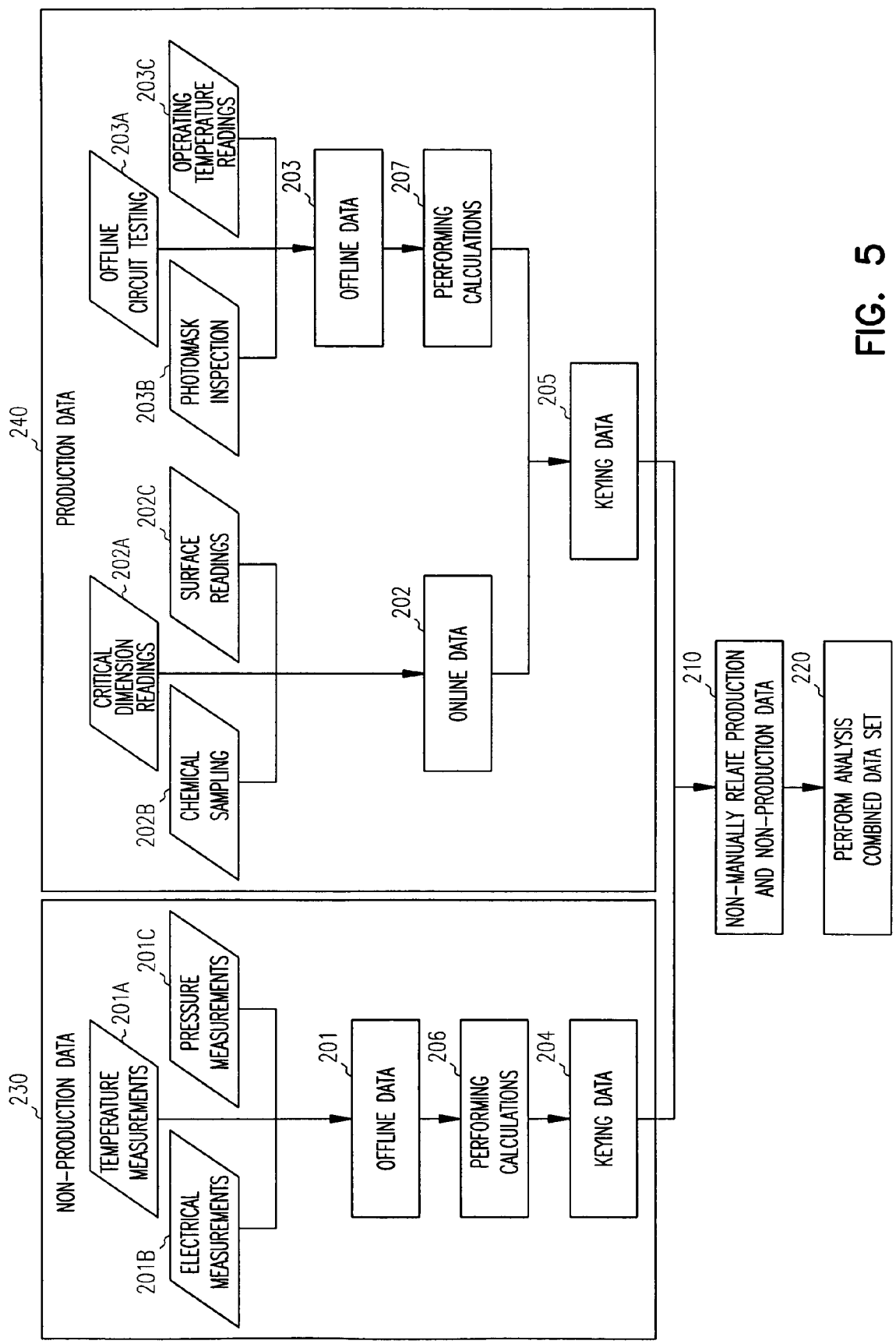
FIG. 5 is a flowchart illustrating generally, among other things, a method for collecting and correlating production and non-production data for analysis according to an embodiment of the present invention.

FIG. 5 is substantially similar to FIG. 2 and presents at a high level a method for combining production (including online and offline) and non-production, with the addition of steps at 206 and 207 for performing calculations on the offline data from both production and non-production sources. Considering the problem of faster data analysis, it is advantageous to calculate a single data point for a single data source. If a single data point is not found, then all data points for that data source would need to be added to the analysis of the data at 220. This would represent a computational cost, both in resources in time that may hinder quicker, more useful data analysis.

In an embodiment, at 206 and 207, the calculation being performed is one of weighting the data. This weighting calculation may be weighted on any number of criteria, including but not being limited to, time, distance, production lots, operators, etc. In the case of a physical distance weighting, the equation can be given as:

$$V = \sum_{n=1}^{i} \left[ \frac{d_i}{\sum_{n=1}^{i} d_i} \right] S_i$$

Where, V is the calculated data point, $d_i$ is the distance between the sampling point and the process location and $S_i$ is the data being measured at the sampling point. This process of weighting by location may be performed on both production and non-production data, as some production data measurements may be separated by some non-fixed distance from the lot undergoing processing as some manufacturing processes are large in size.

In the case of measurements being taken over time, measurements of data points that are closer in time are more relevant to our analysis. Such data points need to weighted based on this time value. Table A represents a progression of production lots being processed, where data samples are being taken. In an embodiment, the samples are being taken at a single location at that time. In an embodiment, the samples are being taken at a plurality of locations at that substantially similar time. In such a case, a weighted mean calculation being weighted by location should be performed first. In Table A the first sampling is Sample 1 and as production lots undergo processing, subsequent measurements are taken, such as Sample 2, Sample 3, Sample 4, etc. In an embodiment, the sampling takes place at a fixed frequency such that a non-variable number of production lots are processed between measurements. In an embodiment, the sampling takes place at a non-fixed frequency such that a variable number of production lots are processed between measurements, as depicted in Table A. The calculated data point is calculated by first determining the time difference between the sample taken some time after the lot was processed and the most recent measurement taken prior to the lot beginning processing. Then weighting the sample point at each sample time by the time difference between when the actual production lot was processed and the sample point, as shown by the exemplary equations in Table A in the Calculated Sample. A generalized equation for weighting by time over a variable time period with a variable number of lots undergoing processing between measurements can be expressed as:

$$V = \left(\frac{1}{tS_{x-1} - tS_x}\right)[S_x(tS_{x+1} - tL_v) + S_{x+1}(tL_v - tS_x)]$$

where V is the calculated lot data to be keyed to the production lot data, $tS_x$ is the time of the most recent facility data sampling, $tS_{x+1}$ is the time of the next consecutive facility data sampling, and $tL_v$ is the time of processing the production lot. This weighting by time can be applied to both production data and non-production data.

TABLE A

| Process | Time of Event | Sampled Value | Calculated Sampled Value assigned to Production Lot |
|---|---|---|---|
| Sample 1 | $tS_1$ | $S_1$ | |
| Lot 1 | $tL_1$ | | $L_1 = 1/(tS_2 - tS_1)\{S_1(tS_2 - tL_1) + S_2(tL_1 - tS_1)\}$ |
| Lot 2 | $tL_2$ | | |
| Lot-$_i$ | $tL_i$ | | $L_i = 1/(tS_3 - tS_2)\{S_2(tS_3 - tL_2) + S_3(tL_2 - tS_2)\}$ |
| Lot-$_{i+1}$ | $tL_{i+1}$ | | |
| Lot-$_{i+2}$ | $tL_{i+2}$ | | |
| Sample 2 | $tS_2$ | $S_2$ | |
| Lot-$_j$ | $tL_j$ | $L_j$ | $L_j = 1/(tS_3 - tS_2)\{S_2(tS_3 - tL_j) + S_3(tL_j - tS_2)\}$ |
| Lot-$_{j+1}$ | | | |
| Lot-$_{j+2}$ | | | |
| Lot-$_{j+3}$ | | | |
| Lot-$_{j+4}$ | | | |
| Lot-$_{j+5}$ | | | |
| Lot-$_{j+6}$ | | | |
| Sample 3 | $tS_3$ | $S_3$ | |
| Lot-$_k$ | $tL_k$ | $L_k$ | $L_k = 1/(tS_4 - tS_3)\{S_3(tS_4 - tL_k) + S_3(tL_k - tS_3)\}$ |
| Lot-$_{k+1}$ | | | |

TABLE A-continued

| Process | Time of Event | Sampled Value | Calculated Sampled Value assigned to Production Lot |
|---|---|---|---|
| Lot-$_{k+2}$ | | | |
| Lot-$_{k+3}$ | | | |
| Lot-$_{k+4}$ | | | |
| Lot-$_{k+5}$ | | | |
| Sample 4 | $tS_4$ | $S_4$ | |
| . | . | . | . |
| . | . | . | . |
| . | . | . | . |

In table A, $tS_{1,2,3,\ldots}$ is defined as the time when a data sample is taken. In table A, $tL_{i,j,k,\ldots}$ is defined as the time when a production lot process is begun. In table A, $-S_{1,2,3,\ldots}$ is defined as the data sampled. In table A, $L_{i,j,k,\ldots}$ is defined as the lot data calculated. In the present invention the calculation performed to arrive at $L_{i,j,k,\ldots}$ is a weighted mean calculation.

Integration of equipment data as another type of facility data presents an additional problem not addressed by the above equations. In an embodiment, this equipment data is tool qualification data. Data in respect to equipment control is sampled during periodic tool qualification. In an embodiment, the period of tool qualification is daily. This information is stored with an associated time-stamp and the equipment ID's as well as facility data. In an embodiment, this facility data is as described herein. In an embodiment, the equipment data is gathered with production data in the same way that facility data is gathered with production data. In some cases, equipment data can not be used due to maintenance that may reset the equipment condition. In an embodiment, a weighted mean calculation is used to calculate the equipment data value to be assigned to a particular lot. In an embodiment, the weighted mean calculation is weighted by time. In an embodiment, the weighted mean calculation is weighted by some value other then time.

Figure 6A:
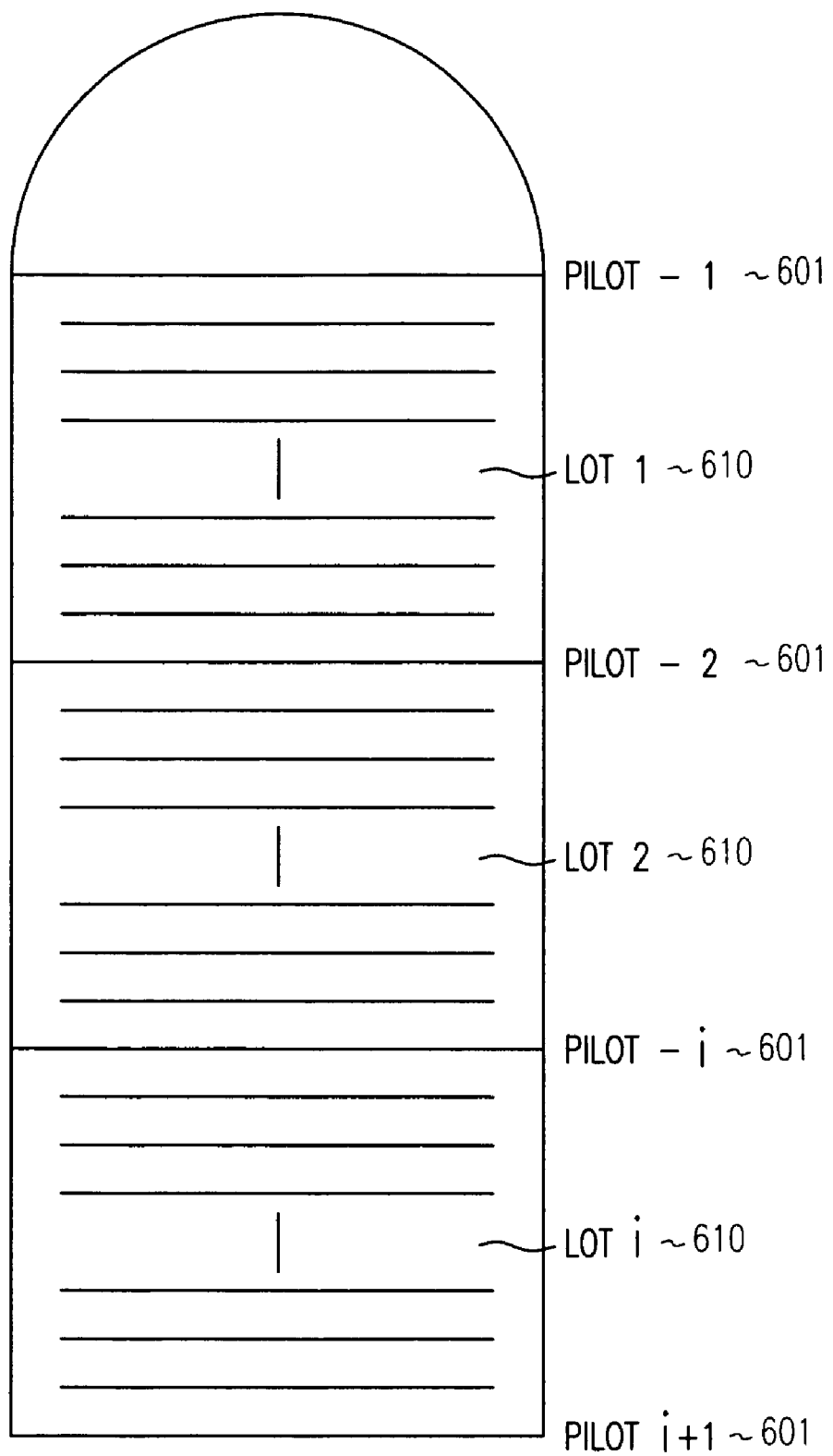
FIG. 6A is a pictorial representation of a vertical furnace operation according to an embodiment of the present invention.
Figure 6B:
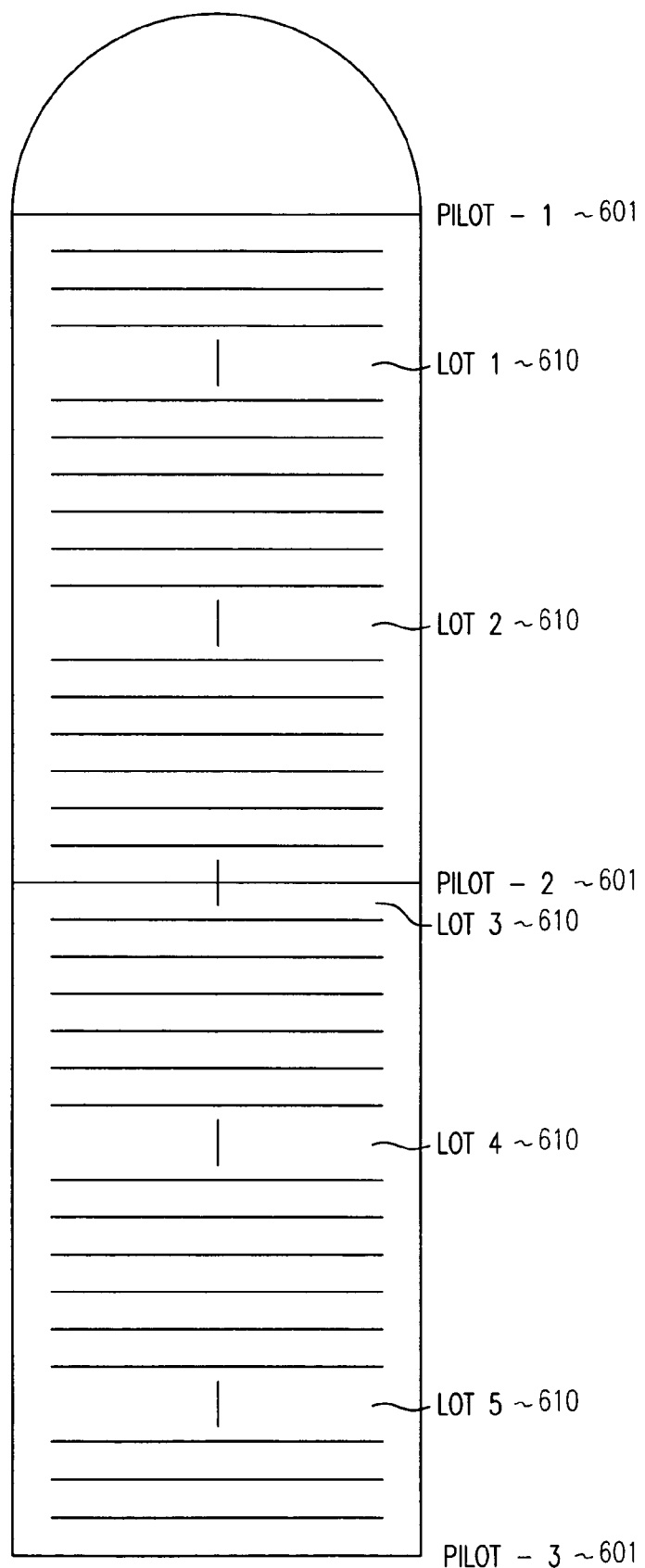
FIG. 6B is a pictorial representation of a vertical furnace operation according to an embodiment of the present invention.

FIG. 6A and FIG. 6B depict vertical furnace operations. Vertical furnace operations are part of process 110 in an embodiment. In a vertical furnace operation a pilot wafer 601 is used to monitor film thickness. It would be useful if this pilot wafer data could be gathered and stored with production data. Pilot wafers 601 may be used between single lots of production wafers 610, between multiple lots of production wafers 610. If a pilot wafer 601 is inserted into the space between lots, as depicted in FIG. 6A, the calculation of the lot data can be given by the following calculation:

$$V_i = \frac{(P_i + P_{i+1})}{2}$$

where, $V_i$ is the calculated pilot wafer data, $P_i$ is the measured pilot wafer data and $P_{i+1}$ is the next measured pilot wafer data. If a pilot wafer 601 is placed at the top, center and bottom of all processed lots, as depicted in FIG. 6B, the lot data can be given by the following equations:

$$V_1 = \frac{P_1 + P_2}{2}$$

$$V_2 = \frac{P_1 + P_2}{2}$$

-continued $$V_3 = P_2$$
$$V_4 = \frac{P_2 + P_3}{2}$$
$$V_5 = \frac{P_2 + P_3}{2}$$

where, $V_1 \sim V_5$ are the calculated pilot wafer data and $P_1 \sim P_3$ are the measured pilot wafer data. Pilot wafers 601 may also be used at some other interval to determine film thickness. In an embodiment, an average of pilot wafer readings before and after processing of a single lot is completed is used. In an embodiment, the first pilot wafer reading made some time after the completion of the processing of the production wafer lots is averaged with the first pilot wafer reading made some time before the processing of the production wafer lot is begun. In an embodiment, the pilot wafer reading made during the processing of lot is used as the pilot wafer data for that production wafer lot.

In an embodiment of the present invention the data collected from the various production and non-production sources is correlated, with reference to FIGS. 2 and 5. At 210 this correlation is performed non-manually using at least one point of data commonality. The points of data commonality may be amongst any number of items, including, but not limited to, production lot ID's, date-time values, locational, etc. In an embodiment, it is advantageous to provide a date-time value to all the data being calculated as it provides an easy reference from which to non-manually related the production and non-production data. Data related to the actual production lot is keyed with the time that a particular lot passed through a particular process. The production and non-production data that is gathered during the times where that lot is being processed by a particular process are weighted by location and then by time to determine a data point that is most related to the specific production lot and the specific production process that lot was going through that period.

By collecting data points that are easily related to each other by non-manual means, a system can quickly relate the data, and then analyze that data, providing the manufacturing operator with indicators as to the wellness of the manufacturing operation. Such a system is described in further detail below and in FIG. 7. In an embodiment, a system is used to monitor each individual manufacturing process. In an embodiment, a system is used to monitor multiple manufacturing processes. In an embodiment, the manufacturing operator monitors the readings of the system and determines whether an out of specification condition exists and can manually stop the manufacturing operation for further investigation. In an embodiment, the manufacturing operator responds to system generated messages of out of specification conditions to manually stop the manufacturing operation for further investigation. In an embodiment, the system determines, without any operator intervention, whether an out of specification condition exists and non-manually ceases the particular manufacturing process under consideration, without any operator intervention. In an embodiment, a manufacturing operator responds to conditions that are within specifications by allowing the manufacturing process to continue. In an embodiment, a system responds to conditions that are within specifications by non-manually allowing the manufacturing process to continue, without any operator intervention.

Figure 7:
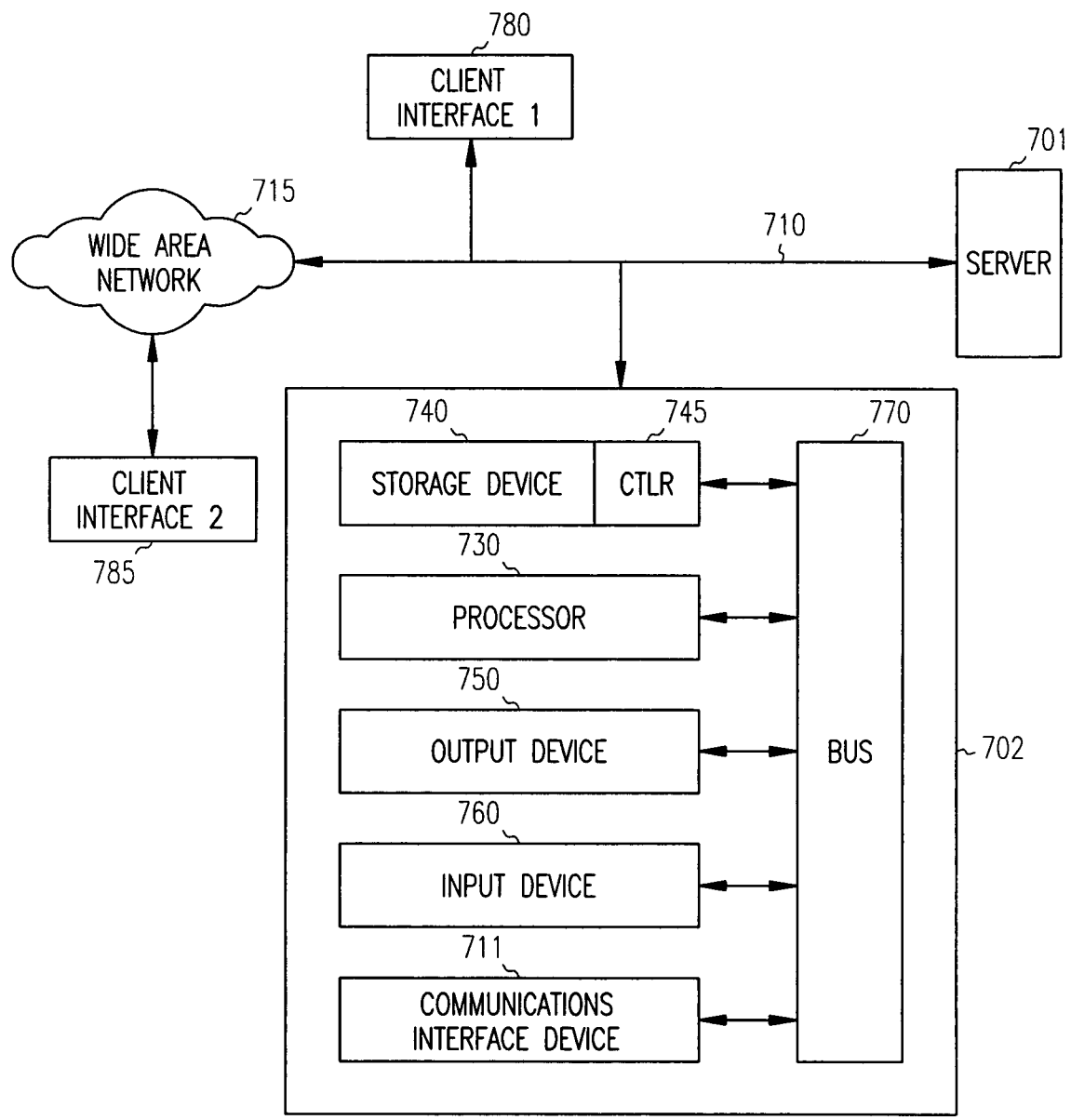
FIG. 7 is a block diagram illustrating generally, among other things, one example of portions of a data analysis system, and an environment with which it is used, for processing and analyzing production and non-production data.

FIG. 7 depicts a block diagram of a system for implementing an embodiment of the invention analogous to the data processor 130 shown in FIG. 1. Illustrated are a server 701 connected to a computer 702 via a network 710. Although one server 701, one computer 702, and one network 710 are shown, in other embodiments any number or combination of them may be present. Although the server 701 and the network 710 are shown, in another embodiment they may not be present.

The computer 702 may include a processor 730, a storage device 740, a communications interface device 711, an output device 750, and an input device 760, all connected via a bus 770.

The processor 730 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 730 may execute instructions and may include that portion of the computer 702 that controls the operation of the entire computer. Although not depicted in FIG. 7, the processor 730 typically includes a control unit that organizes data and program storage in memory and transfers data and other information between the various parts of the computer 702. The processor 730 may receive data from the input device 760, may read and store code and data in the storage device 740, may send data to the output device 750, and may send and receive code and/or data to/from the network 710.

Although the computer 702 is shown to contain only a single processor 730 and a single bus 770, the present invention applies equally to computers that may have multiple processors and to computers that may have multiple buses with some or all performing different functions in different ways. Although the computer 702 is shown to contain only a single communications interface device 711, the present invention applies equally to computers that may have multiple communications interface devices with some or all performing difference functions in different ways.

The storage device 740 represents one or more mechanisms for storing data. For example, the storage device 740 may include read only memory (ROM), random access memory (RAM), magnetic disk storage media, optical storage media, flash memory devices, and/or other machine-readable media. In other embodiments, any appropriate type of storage device may be used. Although only one storage device 740 is shown, multiple storage devices and multiple types of storage devices may be present. Further, although the computer 702 is drawn to contain the storage device 740, it may be distributed across other computers, for example on server 701.

The storage device 740 includes a controller 745, which in an embodiment may include instructions capable of being executed on the processor 730 to carry out the functions of the present invention. In another embodiment, some or all of the functions of the present invention may be carried out via hardware in lieu of a processor-based system. Although the controller 745 is shown to be contained within the storage device 740 in the computer 702, some or all of the controller 745 may be distributed across other systems, for example on the server 701 and accessed via the network 710.

The input device 760 may be a keyboard, pointing device, mouse, trackball, touchpad, touchscreen, keypad, microphone, voice recognition device, or any other appropriate mechanism for the user to input data to the computer 702. Although only one input device 760 is shown, in another embodiment any number and type of input devices may be present.

The output device 750 is that part of the computer 702 that communicates output to the user. The output device 750 may be a cathode-ray tube (CRT) based video display well known in the art of computer hardware. But, in other embodiments the output device 750 may be replaced with a liquid crystal display (LCD) based or gas, plasma-based, flat-panel display. In another embodiment, the output device 750 may be a speaker. In still other embodiments, any appropriate output device suitable for presenting data may be used. Although only one output device 750 is shown, in other embodiments, any number of output devices of different types or of the same type may be present.

The communications interface device 711 is that part of the computer which communicates with the network 710. The communications interface device 711 may be a network interface card (NIC) or modem. The NIC may include a readily available 10/100 Ethernet compatible card or a higher speed network card such as a gigabit Ethernet or fiber optic enabled card. Other examples include wireless network cards that operate at one or more transmission speeds, or multiple NICs to increase the speed at which data can be exchanged over a network 710.

The bus 770 may represent one or more busses, e.g., PCI, ISA (Industry Standard Architecture), X-Bus, EISA (Extended Industry Standard Architecture), or any other appropriate bus and/or bridge (also called a bus controller).

The computer 702 may be implemented using any suitable hardware and/or software, such as a personal computer or other electronic computing device. Portable computers, laptop or notebook computers, PDAs (Personal Digital Assistants), two-way alphanumeric pagers, keypads, portable telephones, appliances with a computing unit, pocket computers, and mainframe computers are examples of other possible configurations of the computer 702. The hardware and software depicted in FIG. 7 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 710 may be any suitable network and may support any appropriate protocol suitable for communication between the server 701 and the computer 702. In an embodiment, the network 710 may support wireless communications. In another embodiment, the network 710 may support hard-wired communications, such as a telephone line or cable. In another embodiment, the network 710 may support the Ethernet IEEE (Institute of Electrical and Electronics Engineers) 802.3x specification. In another embodiment, the network 710 may be the Internet and may support IP (Internet Protocol). In another embodiment, the network 710 may be a local area network (LAN) or a wide area network (WAN). In another embodiment, the network 710 may be a hotspot service provider network. In another embodiment, the network 710 may be an intranet. In another embodiment, the network 710 may be a GPRS (General Packet Radio Service) network. In another embodiment, the network 710 may be any appropriate cellular data network or cell-based radio network technology. In another embodiment, the network 710 may be an IEEE 802.11x wireless network, where x is any alphanumeric character used to designate a specific standard. In still another embodiment, the network 710 may be any suitable network or combination of networks. Although one network 710 is shown, in other embodiments any number of networks (of the same or different types) may be present.

In an embodiment the non-manual relation and analysis of the data may be performed by computer code contained on the storage device 740 and further operated on by the processor 730 of the computer 702. In an embodiment the analysis is displayed to a user via the output device 750.

In an embodiment the non-manual relation and analysis of the data may be performed by the server 701 configured similarly to the computer 702 in that it has computer code contained in a storage device similar to the storage device 740 of the computer 702 and that computer code is operated on by a processor similar to the processor 730 of the computer 702.

In an embodiment the analysis is transmitted over a network 710 to a Client Interface 1 780. In an embodiment the Client Interface 1 is physically separated from the server 702. In an embodiment the analysis is transmitted over a network 710 and further over a Wide Area Network 715, such as the Internet, to a Client Interface 2 785. In an embodiment the analysis is conducted on Client Interface 1 and the data is transmitted over the communications network 710 for operations to be performed on Client Interface 1 780, configured similarly to the computer 702 of FIG. 7. In an embodiment the analysis is conducted on Client Interface 2 785 and the data is transmitted over the communications network 710, and further over the Wide Area Network 785, such as the Internet, for operations to be performed on Client Interface 2 785, configured similarly to the computer 702 of FIG. 7.

In an embodiment, the examination of the analysis is conducted by a manufacturing operator via a Client Interface 1 780 accessing the data remotely over a communications network 710 from a server 702. In an embodiment, the examination of the analysis is conducted by a manufacturing operator via a Client Interface 2 785 accessing the data remotely over a communications network 710, and further over a Wide Area Network 715, such as the Internet, from a server 702.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

There are distinct advantages to this type of data correlation and subsequent analysis. It allows for a single trend chart to measure trends in the data. It also provides for an "apples to apples" relational study and makes a correlation study or statistical analysis simpler to achieve.

What is claimed is:

1. A method for performing data analysis on data gathered in an electronic device manufacturing process comprising:

collecting production data by taking at least one measurement directly on an item that is undergoing processing in the electronic device manufacturing process;

collecting non-production data by taking at least one measurement related to an entire manufacturing facility where the electronic device manufacturing process resides and not directly related to the electronic device manufacturing process;

performing calculations on the production data including weighting the production data based on distance between a sampling point for the production data and a process location;

performing calculations on the non-production data including weighting the non-production data based on distance between a sampling point for the non-production data and a process location;

keying the production data;

keying the non-production data;

combining the production data and the non-production data into a single data set;

storing the single data set on a computer memory; and analyzing said single data-set to determine conditions in the electronic device manufacturing process.

2. The method of claim 1, wherein collecting production data includes collecting production data from a test probe.

3. The method of claim 1, wherein collecting production data includes collecting parametric production data.

4. The method of claim 1, wherein collecting production data includes collecting data on film thickness.

5. The method of claim 1, wherein collecting production data includes collecting data on critical dimensions.

6. The method of claim 1, wherein collecting non-production data includes collecting non-production data from a single data source at a single source location.

7. The method of claim 1, wherein collecting non-production data includes collecting non-production data from a single data source from a plurality of locations.

8. A method for performing data analysis on data gathered in an electronic device manufacturing process, comprising:

collecting production data by taking at least one measurement directly on an item that is undergoing processing in the electronic device manufacturing process;

collecting non-production data from a single data source from at least one of a plurality of locations with some temporal periodicity by taking at least one measurement related to an entire manufacturing facility where the electronic device manufacturing process resides and not directly related to the electronic device manufacturing process;

performing calculations on the production data including weighting the production data based on distance between a sampling point for the production data and a process location;

performing calculations on the non-production data including weighting the non-production data based on distance between a sampling point for the non-production data and a process location;

keying the production data;

keying the non-production data;

combining the production data and the non-production data into a single data set;

storing the single data set on a computer memory; and analyzing said single data-set to determine conditions in the electronic device manufacturing process.

9. The method of claim 8, wherein the temporal periodicity is fixed.

10. The method of claim 8, wherein collecting non-production data includes collecting atmospheric data.

11. The method of claim 8, wherein collecting non-production data includes collecting facility related quality data.

12. The method of claim 8, wherein collecting non-production data includes collecting equipment control data.

13. The method of claim 8, wherein collecting non-production data includes collecting metrology tool calibration data.

14. A method for performing data analysis on data gathered in an electronic device manufacturing process, comprising:

collecting production data by taking at least one measurement directly on an item that is undergoing processing in the electronic device manufacturing process;

collecting non-production data by taking at least one measurement related to an entire manufacturing facility where the electronic device manufacturing process resides and not directly related to the electronic device manufacturing process;

performing calculations on the production data;

performing weighted mean calculations on the non-production data;

keying the production data;

keying the non-production data;

combining the production data and the non-production data into a single data set;

storing the single data set on a computer memory; and analyzing said single data-set to determine conditions in the electronic device manufacturing process.

15. The method of claim 14 wherein the weighted mean calculations are weighted first by location where a plurality of data sources are from a plurality of locations, given by the following equation:

$$V = \sum_{n=1}^{i} \left[ \frac{d_i}{\sum_{n=1}^{i} d_i} \right] S_i$$

where, V is a calculated data point, $d_i$ is a distance between a sampling point and a process location and $S_i$ is data being measured at the sampling point.

16. A method for performing data analysis on data gathered in an electronic device manufacturing process, comprising:

collecting production data by taking at least one measurement directly on an item that is undergoing processing in the electronic device manufacturing process;

collecting non-production data by taking at least one measurement related to an entire manufacturing facility where the electronic device manufacturing process resides and not directly related to the electronic device manufacturing process;

performing calculations on the production data;

performing weighted mean calculations on the non-production data;

keying the production data;

keying the non-production data;

identifying points of data commonality between the production and non-production data set;

defining relationships based on the identified commonalities;

combining the production data and the non-production data based on the defined relationships into a single data-set;

storing the single data-set on a computer memory; and analyzing said single data-set to determine conditions in the electronic device manufacturing process.

17. The method of claim 16, wherein analyzing said single data set includes performing a trend analysis.

18. The method of claim 16, wherein analyzing said single data set includes statistical analysis.

19. A method for detecting trends in electronic device manufacturing, comprising:
- collecting production data by taking at least one measurement directly on an item that is undergoing processing in an electronic device manufacturing process;
- collecting non-production data by taking at least one measurement related to an entire manufacturing facility where the electronic device manufacturing process resides and not directly related to the electronic device manufacturing process;
- performing calculations on the production data including weighting the production data based on distance between a sampling point for the production data and a process location;
- performing calculations on the non-production data including weighting the non-production data based on distance between a sampling point for the non-production data and a process location;
- keying production data;
- keying non-production data;
- combining the production data and the non-production data into a single data set;
- storing the single data set on a computer memory;
- analyzing said data set; and
- examining the analysis of the data for conditions of the electronic device manufacturing process.

20. The method of claim 19, wherein collecting production data includes collecting production data from a test probe.

21. The method of claim 19, wherein collecting production data includes collecting parametric production data.

22. The method of claim 19, wherein collecting production data includes collecting data on film thickness.

23. The method of claim 19, wherein collecting production data includes collecting data on critical dimensions.

24. The method of claim 19, wherein collecting non-production data includes collecting non-production data from a single data source at a single source location.

25. The method of claim 19, wherein collecting non-production data includes collecting non-production data from a single data source from a plurality of locations.

26. A method for detecting trends in electronic device manufacturing, comprising:
- collecting production data by taking at least one measurement from an electronic device manufacturing process directly related to a machine used in the electronic device manufacturing process and taken at the time the electronic device manufacturing process is being performed on an item and that is not measured on the item that is undergoing processing in the electronic device manufacturing process;
- collecting non-production data from a single data source with some temporal periodicity by taking at least one measurement related to an entire manufacturing facility where the electronic device manufacturing process resides and not directly related to the electronic device manufacturing process;
- performing calculations on the production data including weighting the production data based on distance between a sampling point for the production data and a process location;
- performing calculations on the non-production data including weighting the non-production data based on distance between a sampling point for the non-production data and a process location;
- keying the production data;
- keying the non-production data;
- combining the production data and the non-production data into a single data set;
- storing the single data set on a computer memory;
- analyzing the single data set; and
- examining the analysis of the data for conditions of the electronic device manufacturing process.

27. The method of claim 26, wherein the temporal periodicity is fixed.

28. The method of claim 26, wherein collecting non-production data includes collecting atmospheric data.

29. The method of claim 26, wherein collecting non-production data includes collecting facility related quality data.

30. The method of claim 26, wherein collecting non-production data includes collecting equipment control data.

31. The method of claim 26, wherein collecting non-production data includes collecting metrology tool calibration data.

32. A method for detecting trends in electronic device manufacturing, comprising:
- collecting production data by taking at least one measurement from an electronic device manufacturing process directly related to a machine used in the electronic device manufacturing process and taken at the time the electronic device manufacturing process is being performed on an item and that is not measured on the item that is undergoing processing in the electronic device manufacturing process;
- collecting non-production data by taking at least one measurement related to an entire manufacturing facility where the electronic device manufacturing process resides and not directly related to the electronic device manufacturing process;
- performing calculations on the production data;
- performing weighted mean calculations on the non-production data;
- keying the production data;
- keying the non-production data;
- combining the production data and the non-production data into a single data set;
- storing the single data set on a computer memory;
- analyzing the single data set; and
- examining the analysis of the data for conditions of the electronic device manufacturing process.

33. The method of claim 32, wherein the weighted mean calculation is weighted first by location where the data sources are from a plurality of locations, given by the following equation:

$$V = \sum_{n=1}^{i} \left[ \frac{d_i}{\sum_{n=1}^{i} d_i} \right] S_i$$

where, V is a calculated data point, $d_i$ is a distance between the sampling point and a process location and $S_i$ is a data being measured at the sampling point.

34. The method of claim 32, wherein keying the production data includes adding the calculated non-production data to the appropriate production data.

35. The method of claim 34 wherein the appropriate production data is data from production lots that were processed during the collection of relevant non-production data.

36. A method for detecting trends in electronic device manufacturing, comprising:

collecting production data by taking at least one measurement directly on an item that is undergoing processing in an electronic device manufacturing process;

collecting non-production data by taking at least one measurement related to an entire manufacturing facility where the electronic device manufacturing process resides and not directly related to the electronic device manufacturing process;

performing calculations on the production data;

performing weighted mean calculations on the non-production data;

keying the production data;

keying the non-production data;

identifying points of data commonality between the production and non-production data set;

defining relationships based on the identified commonalities;

combining the production data and the non-production data based on the defined relationships into a single data-set;

storing the single data-set on a computer memory;

analyzing the single data-set; and examining the analysis of the data for conditions of the electronic device manufacturing process.

37. The method of claim 36, wherein analyzing said single data set includes performing a trend analysis.

38. The method of claim 36, wherein analyzing said single data set includes statistical analysis.

39. The method of claim 36, wherein the analyzing includes analyzing the data on a data processing device.

40. The method of claim 36, wherein the analyzing includes analyzing the data on an output device.

41. The method of claim 36, wherein the analyzing includes analyzing the data remotely over a communications network.

42. The method of claim 36, wherein the analyzing includes analyzing the data remotely over a Wide Area Network.

43. A method for detecting trends in electronic device manufacturing, comprising:

collecting production data by taking at least one measurement directly on an item that is undergoing processing in an electronic device manufacturing process;

collecting non-production data by taking at least one measurement related to an entire manufacturing facility where the electronic device manufacturing process resides and not directly related to the electronic device manufacturing process;

performing calculations on the production data, wherein the measurements of the production data are taken over time and wherein the production data is weighted based on a time value;

performing weighted mean calculations on the non-production data;

keying the production data;

keying the non-production data;

identifying points of data commonality between the production and non-production data set;

defining relationships based on the identified commonalities;

combining the production data and the non-production data based on the defined relationships into a single data-set;

storing the single data-set on a computer memory;

analyzing the single data-set; and examining the analysis of the data for conditions of the electronic device manufacturing process.

44. The method of claim 43, wherein examining analysis of the data includes comparing the analysis of the collected data to some baseline analysis and identifying areas where trends are out of specifications.

45. The method of claim 43, wherein examining analysis of the data includes comparing the analysis of the collected data to some baseline analysis and identifying areas where readings are out of specifications.

46. The method of claim 43, wherein examining analysis of the data includes comparing the analysis of the collected data to some baseline analysis and identifying areas where trends and readings are out of specifications.

47. The method of claim 43, wherein the examining analysis includes storing the analyzed data on a server, accessing the data remotely over a communications network from a server and viewing the data on a client interface.

48. The method of claim 47, wherein the examining analysis includes storing the analyzed data on a server, accessing the data remotely over a Wide Area Network from a server and viewing the data on a client interface.

49. A computer system, comprising:

a processor;

at least one input device;

at least one output device;

at least one communications interface device;

a storage device containing instructions for performing a method, the method comprising:

collecting production data by taking at least one measurement directly on an item that is undergoing processing in an electronic device manufacturing process;

collecting non-production data by taking at least one measurement related to an entire manufacturing facility where the electronic device manufacturing process resides and not directly related to the electronic device manufacturing process;

performing calculations on the production data including weighting the non-production data based on distance between a sampling point for the non-production data and a process location;

performing calculations on the non-production data including weighting the non-production data based on distance between a sampling point for the non-production data and a process location;

keying production data;

keying non-production data;

combining the production data and the non-production data into a single data set;

analyzing said data set; and examining the analysis of the data; and a bus connecting the processor, input device, output device and storage device.

50. The computer system of claim 49, wherein collecting production data includes collecting production data from a test probe.

51. The computer system of claim 49, wherein collecting production data includes collecting parametric production data.

52. The computer system of claim 49, wherein collecting production data includes collecting data on film thickness.

53. The computer system of claim 49, wherein collecting production data includes collecting data on critical dimensions.

54. The computer system of claim 49, wherein collecting non-production data includes collecting non-production data from a single data source at a single source location.

55. The computer system of claim 49, wherein collecting non-production data includes collecting non-production data from a single data source from a plurality of locations.

56. A computer system, comprising:
a processor;
at least one input device;
at least one output device;
at least one communications interface device;
a storage device containing instructions for performing a method, the method comprising:
collecting production data by taking at least one measurement directly on an item that is undergoing processing in an electronic device manufacturing process;
collecting non-production data from a single data source with some temporal periodicity by taking at least one measurement related to an entire manufacturing facility where the electronic device manufacturing process resides and not directly related to the electronic device manufacturing process;
performing calculations on the production data including weighting the non-production data based on distance between a sampling point for the non-production data and a process location;
performing calculations on the non-production data including weighting the non-production data based on distance between a sampling point for the non-production data and a process location;
keying the production data;
keying the non-production data;
combining the production data and the non-production data into a single data set;
analyzing the single data set; and
examining the analysis of the data; and
a bus connecting the processor, input device, output device, communications interface device and storage device.

57. The computer system of claim 56, wherein the temporal periodicity is fixed.

58. The computer system of claim 56, wherein collecting non-production data includes collecting atmospheric data.

59. The computer system of claim 56, wherein collecting non-production data includes collecting facility related quality data.

60. The computer system of claim 56, wherein collecting non-production data includes collecting equipment control data.

61. The computer system of claim 56, wherein collecting non-production data includes collecting metrology tool calibration data.

62. The computer system of claim 56, wherein collecting non-production data includes collecting any other data relevant to the production environment.

63. A computer system, comprising:
a processor;
at least one input device;
at least one output device;
at least one communications interface device;
a storage device containing instructions for performing a method, the method comprising:
collecting production data by taking at least one measurement directly on an item that is undergoing processing in an electronic device manufacturing process;
collecting non-production data from a single data source with some temporal periodicity by taking at least one measurement related to an entire manufacturing facility where the electronic device manufacturing process resides and not directly related to the electronic device manufacturing process;
performing calculations on the production data;
performing weighted mean calculations on the non-production data;
keying the production data;
keying the non-production data;
combining the production data and the non-production data into a single data set;
analyzing the single data set; and
examining the analysis of the data; and
a bus connecting the processor, input device, output device, communications interface device and storage device.

64. The computer system of claim 63, wherein the weighted mean calculation is weighted first by location where the data sources are from a plurality of locations, given by the following equation:

$$V = \sum_{n=1}^{i} \left[ \frac{d_i}{\sum_{n=1}^{i} d_i} \right] S_i$$

where, V is a calculated data point, $d_i$ is a distance between the sampling point and a process location and $S_i$ is a data being measured at the sampling point.

65. The computer system of claim 63, wherein keying the production data includes adding the calculated non-production data to the appropriate production data.

66. The computer system of claim 65, wherein the appropriate production data is data from production lots that were processed during the collection of relevant non-production data.

67. A computer system, comprising:
a processor;
at least one input device;
at least one output device;
at least one communications interface device;
a storage device containing instructions for performing a method, the method comprising:
collecting production data by taking at least one measurement directly on an item that is undergoing processing in an electronic device manufacturing process;
collecting non-production data by taking at least one measurement related to an entire manufacturing facility where the electronic device manufacturing process resides and not directly related to the electronic device manufacturing process;
performing calculations on the production data;
performing weighted mean calculations on the non-production data;
keying the production data;
keying the non-production data;
identifying points of data commonality between the production and non-production data set;
defining relationships based on the identified commonalities;
combining the production data and the non-production data based on the defined relationships into a single data-set;
analyzing the single data-set; and
examining the analysis of the data; and a bus connecting the processor, input device, output device, communications interface device and storage device.

68. The computer system of claim 67, wherein analyzing said single data set includes performing a trend analysis.

69. The computer system of claim 67, wherein analyzing said single data set includes statistical analysis.

70. The computer system of claim 67, wherein examining analysis of the data includes comparing the analysis of the collected data to some baseline analysis and identifying areas where trends are out of specifications.

71. The computer system of claim 67, wherein examining analysis of the data includes comparing the analysis of the collected data to some baseline analysis and identifying areas where readings are out of specifications.

72. The computer system of claim 67, wherein examining analysis of the data includes comparing the analysis of the collected data to some baseline analysis and identifying areas where trends and readings are out of specifications.

73. A computer system, comprising:
a processor;
at least one input device;
at least one output device;
at least one communications interface device;
a storage device containing instructions for performing a method, the method comprising:
    collecting production data by taking at least one measurement directly on an item that is undergoing processing in an electronic device manufacturing process;
    collecting non-production data by taking at least one measurement related to an entire manufacturing facility where the electronic device manufacturing process resides and not directly related to the electronic device manufacturing process;
    performing calculations on the production data;
    performing weighted mean calculations on the non-production data;
    keying the production data;
    keying the non-production data;
    identifying points of data commonality between the production and non-production data set;
    defining relationships based on the identified commonalities;
    combining the production data and the non-production data based on the defined relationships into a single data-set;
    analyzing a single data-set stored remotely on a server; and
    examining the analysis of the data; and
a bus connecting the processor, input device, output device, communications interface device and storage device.

74. The computer system of claim 73, wherein analyzing said single data set includes performing a trend analysis.

75. The computer system of claim 73, wherein analyzing said single data set includes statistical analysis.

76. The computer system of claim 73, wherein examining analysis of the data includes comparing the analysis of the collected data to some baseline analysis and identifying areas where trends are out of specifications.

77. The computer system of claim 73, wherein examining analysis of the data includes comparing the analysis of the collected data to some baseline analysis and identifying areas where readings are out of specifications.

78. The computer system of claim 73, wherein examining analysis of the data includes comparing the analysis of the collected data to some baseline analysis and identifying areas where trends and readings are out of specifications.

79. A computer system, comprising:
a processor;
at least one input device;
at least one output device;
at least one communications interface device;
a storage device containing instructions for performing a method, the method comprising:
    collecting production data by taking at least one measurement directly on an item that is undergoing processing in an electronic device manufacturing process;
    collecting non-production data by taking at least one measurement related to an entire manufacturing facility where the electronic device manufacturing process resides and not directly related to the electronic device manufacturing process;
    performing calculations on the production data, wherein the measurements of the production data are taken over time and wherein the production data is weighted based on a time value;
    performing calculations on the non-production data including weighting the non-production data based on distance between a sampling point for the non-production data and a process location;
    keying production data;
    keying non-production data;
    combining the production data and the non-production data into a single data set;
    analyzing said data set;
    examining the analysis of the data; and
    responding to the examination of the analysis; and
a bus connecting the processor, input device, output device, communications interface device and storage device.

80. The computer system of claim 79, wherein the responding includes an alert message displayed on the output device when the examination detects a trend in the data that is outside of expected results.

81. The computer system of claim 79, wherein the responding includes an alert message displayed on the output device when the examination detects a data reading that is outside of expected results.

82. The computer system of claim 79, wherein the responding includes an alert message displayed on the output device when the examination detects a trend in the data and a reading in the data that is outside of expected results.

83. The computer system of claim 79, wherein the responding includes non-manually halting the manufacturing process when the examination detects a trend in the data that is outside of expected results.

84. The computer system of claim 79, wherein the responding includes non-manually halting the manufacturing process when the examination detects a reading in the data that is outside of expected results.

85. The computer system of claim 79, wherein the responding includes non-manually halting the manufacturing process when the examination detects a trend in the data and a reading in the data that is outside of expected results.

86. A method of responding to out of specification conditions in electronic device manufacturing, comprising:
    collecting production data from at least one of a plurality of data sources by taking at least one measurement directly on an item that is undergoing processing in an electronic device manufacturing process;
    collecting non-production data from the of plurality of data sources separated by some non-fixed distance from a manufacturing process by taking at least one measurement related to an entire manufacturing facility where the electronic device manufacturing process resides and not directly related to the electronic device manufacturing process;

performing calculations on the production data;

performing weighted mean calculations on the non-production data, weighted by time, distance or distance/time;

keying production data by adding the of a plurality of calculated production data to the production data from the production lots that were processed during the collection of the non-production data;

combining the production data and the non-production data into a single data set;

analyzing said data set; and examining the analysis of the data;

combining the production data and the non-production data based on the defined relationships into a single data-set;

analyzing the single data-set by trend or statistical analysis;

examining the analysis of the data for the occurrence of readings or trends that are out of specifications; and responding to the examination of the analysis.

87. The method of claim 86, wherein responding to the examination of the analysis includes stopping the manufacturing process where the examination detects out of specification readings or trends.

88. The method of claim 86, wherein responding to the examination of the analysis includes continuing production where the examination detects no out of specification readings or trends.

89. The method of claim 86, wherein the analyzing the single data-set includes analyzing a single data set remotely stored on a server.

* * * * *

UNITED STATES PATENT AND TRADEMARK OFFICE
CERTIFICATE OF CORRECTION

PATENT NO. : 7,415,317 B2
APPLICATION NO. : 10/786678
DATED : August 19, 2008
INVENTOR(S) : Toyoshima et al.

Page 1 of 1

It is certified that error appears in the above-identified patent and that said Letters Patent is hereby corrected as shown below:

In column 22, line 64, in Claim 86, after "the" delete "of".
In column 23, line 8, in Claim 86, after "the" delete "of a".

Signed and Sealed this

Eleventh Day of November, 2008

JON W. DUDAS
*Director of the United States Patent and Trademark Office*